Feb. 8, 1955  G. W. KUNTNY  2,701,479
RECORDER DRIVE MECHANISM
Filed Jan. 17, 1952  2 Sheets-Sheet 1
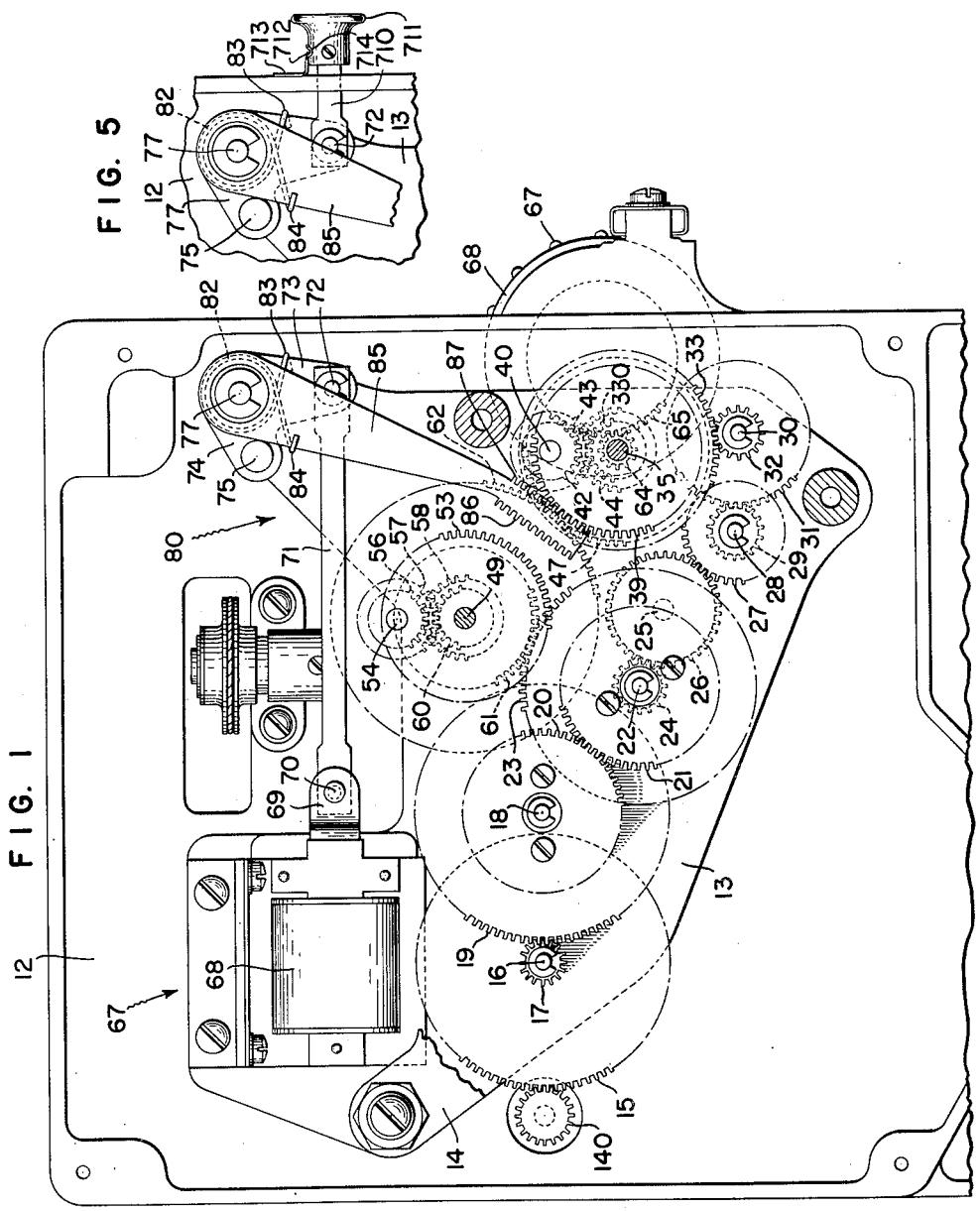
*INVENTOR.*
GREGOR W. KUNTNY
BY *Arthur H. Swanson*
ATTORNEY.

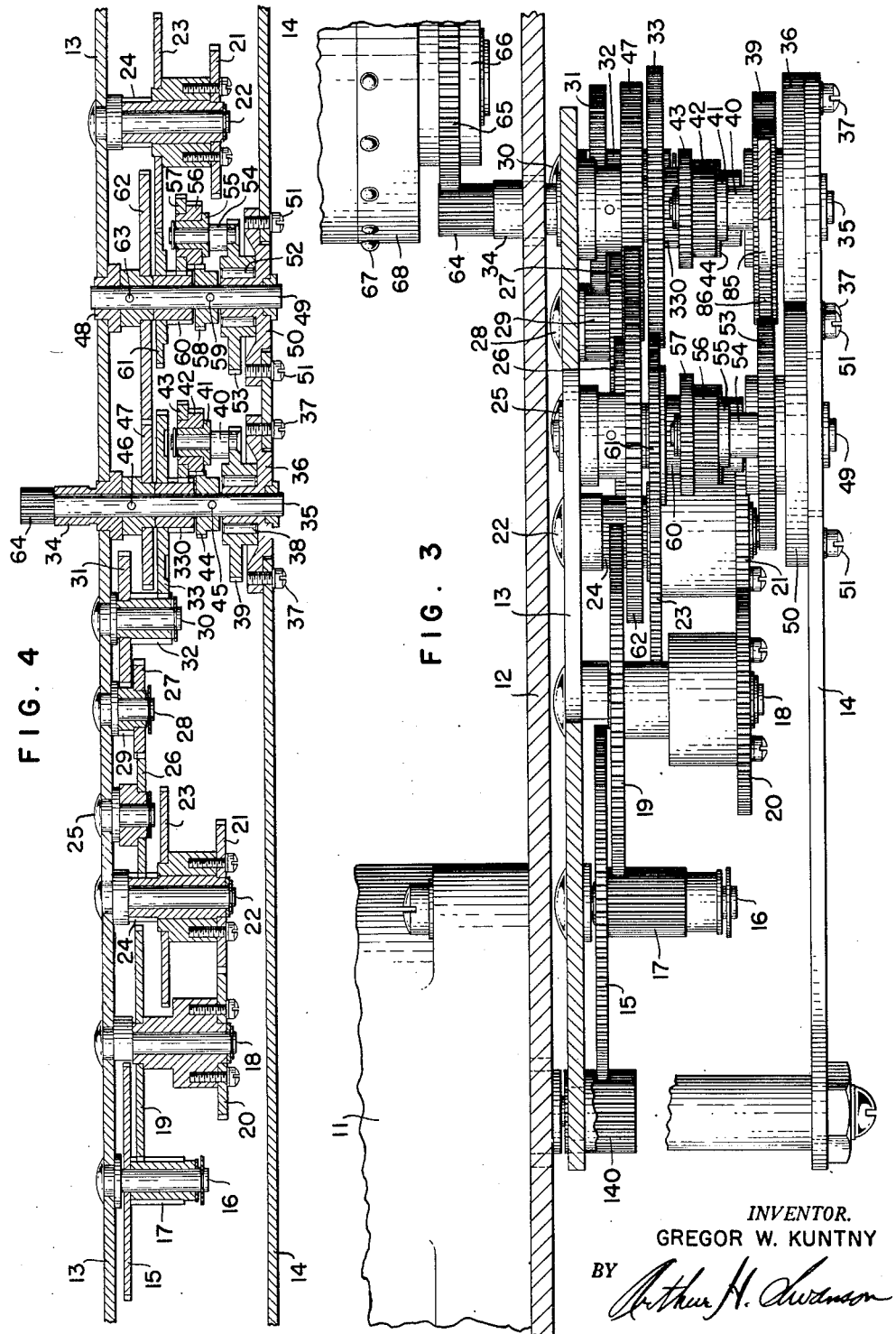

United States Patent Office 2,701,479
Patented Feb. 8, 1955

2,701,479

RECORDER DRIVE MECHANISM

Gregor W. Kuntay, Philadelphia, Pa., assignor to Minneapolis-Honeywell Regulator Company, Minneapolis, Minn., a corporation of Delaware Application January 17, 1952, Serial No. 266,909

10 Claims. (Cl. 74—770)

This invention relates to means for driving the record-receiving chart of a recording and/or controlling instrument at a selected one of two or more available speeds.

It is an object of this invention to provide a multi-speed chart drive in which the gears constituting the different speed gear trains are always in mesh so that all but one gear train idle, and in which the means for selecting the one gear train to be operative can move rapidly from one position to another so that the changeover from one speed to another is practically instantaneous.

A further object of this invention is to provide a chart drive including a motor, a plurality of trains of gearing driven thereby, each of said trains having a different output speed and each including a disc adapted for rotation about a fixed pivot, a planet gear carried by and rotatable relative to said disc and driven by said motor, and a sun gear meshing with said planet gear. Said chart drive also includes one brake arm having brake shoes on it interposed between said discs, and a manually operable means for moving said brake shoe into engagement with one of said discs so as to hold one of said discs stationary and cause said motor to drive one of said planet gears to drive one of said sun gears.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a side elevation of a portion of the device;

Fig. 2 is an end elevation of a smaller portion of the device viewed from the right;

Fig. 3 is a top or plan view on an enlarged scale of the device with parts in horizontal cross section and parts broken away vertically to reveal the parts beneath them;

Fig. 4 is a cross section or axis-to-axis view which would appear if a line were drawn through axes 16—18—22—25—28—30—35—49—22 of Fig. 1 laid out or developed with the shaft 22 and its adjacent mechanism repeated; and Fig. 5 is a side elevation of a smaller portion of the device than is shown in Fig. 1 and depicts a modification.

The device of this invention is intended for use in recorders and/or controllers in which there is provided a movable strip or circular disc adapted to receive markings constituting a record of the variations of some variable which is being measured by a suitable measuring instrument. These variations are transmitted from this measuring instrument to a pen which makes the markings on the chart. Such charts are usually driven at one constant speed. The device of this invention provides means whereby said charts may be driven at one of a plurality of speeds, which driving speed may be manually selected.

In Fig. 3 this chart drive is shown as comprising a motor 11, which may be a spring-wound clock mechanism, or which, in present day practice, is more usually a self-synchronous, alternating current, electric motor. Motor 11 is mounted on a base or support 12 which may form part of the instrument casing. Plates or supports 13 and 14 are likewise stationary supporting elements which may or may not be carried on support 12. Motor 11 has an output shaft on which is mounted gear 140 which projects freely through plate 13. Gear 140 meshes with a gear 15 rotatably mounted on a second axis and rotatable about a stationary shaft 16 riveted or otherwise secured in supporting plate 13. Gear 15 has attached thereto or formed as part thereof gear 17.

Referring to Fig. 4, a stationary shaft 18 is riveted or otherwise secured to supporting plate 13 and has rotatably mounted thereon a gear 19 meshing with gear 17 and a gear 20 meshing with gear 21. Gears 19 and 20 are unitary or connected together.

A stationary shaft 22 is riveted or otherwise secured to supporting plate 13 and carries rotatably thereon gear 21, gear 23, and gear 24 which are unitary or connected for rotation together.

A stationary shaft 25 is riveted or otherwise secured to supporting plate 13 and has a gear 26 rotatable thereon in mesh with gears 24 and 27.

A stationary shaft 28 is riveted or otherwise secured to plate 13 upon which shaft unitary or attached gears 27 and 29 are rotatably mounted.

A stationary shaft 30 is riveted or otherwise secured to plate 13 upon which shaft are rotatably mounted unitary or attached gears 31 and 32 which mesh with gears 29 and 33, respectively.

A bushing or bearing 34 is stationary in supporting plate 13 and supports shaft 35 which is free to rotate in bushing 34. The lower end of shaft 35, as seen in Fig. 4, is free for rotation in a disc 36 which is mounted against rotation on supporting plate 13 by screws 37 or other suitable means. Mounted on disc 36 by means of a non-friction bearing 38 is a disc 39 whose perimeter is roughened or formed with small projections. Carried by and fast on disc 39 is a shaft 40 carrying a bushing 41 which supports unitary or attached gears 42 and 43 for rotation thereon. Gear 42 meshes with a gear 44 which is connected by pin 45 or otherwise held against rotation relative to shaft 35. Pin 46 secures gear 47 to shaft 35. Gear 33 is free to rotate on shaft 35 and is not connected to gear 44 nor to gear 47. Gear 43 meshes with gear 330 which is unitary with or attached to gear 33. Gears 33 and 330 rotate freely on shaft 35.

A bushing or bearing 48 is stationary in supporting plate 13 and carries a shaft 49 free for rotation therein. Shaft 49 is mounted at its opposite end in a stationary disc 50, disc 50 being secured to supporting plate 14 by screws or like securing means 51. The central portion of disc 50 is formed as a cylindrical trunnion on which is mounted a non-friction bearing 52 which supports for rotation a disc 53 whose edge or perimeter is roughened or serrated. Disc 53 has fixedly mounted thereon shaft 54 which carries a bushing 55 on it. Mounted for rotation on bushing 55 are unitary or attached gears 56 and 57. Gear 56 meshes with gear 58 which is secured to and rotates with shaft 49 by pin 59 or other convenient means. Gear 57 meshes with gear 60 which is unitary with or attached to gear 61. Gears 60 and 61 rotate freely relative to shaft 49 and are not attached to gear 58 nor to gear 62 which is secured to and rotates with shaft 49 by means of pin 63. Gear 62 meshes with and is driven by gear 47.

At the right of Fig. 4, shaft 22 and the parts mounted thereon are repeated or duplicated for better and clearer understanding. From this duplication, it is seen that gear 23 meshes with and drives gear 61.

Shaft 35 has, at its upper end, as seen in Fig. 4, a knurled or serrated portion 64. Referring to Fig. 3 it will be seen that portion 64 drives gear 65 which is connected to and fast on a chart drive roller 66 which has protuberances 67 projecting therefrom and passing through holes in the strip chart 68. It will be readily understood that portion 64 may, if desired, have the driving connection for a circular or disc chart which is well known in this art.

In Fig. 1 are best seen the means for shifting from one gear ratio and consequently one chart speed to another. These means consist of a solenoid, generally indicated at 67, and comprising a coil 68 which is connected to a suitable source of electricity under the control of a suitable circuit-maker-and-breaker, such as a toggle switch (not shown). This switch may be mounted on the instrument casing 12 or any other convenient location either close to or remote from the recording and/or controlling instrument in which the chart is mounted. Solenoid 67 also has an armature 69 in the form of a cylindrical core slidable along the axis of the mounting for coil 68. At its left end, as seen in Fig. 1, armature 69 is connected by pin 70 to a link 71. Link 71 is connected at its opposite end by pin 72 to arm 73 of a two-armed lever. The other arm 74 of this lever has a pin 75 on it. Pin 75 bears against one edge of arm 85 hereinafter mentioned. As seen in Fig. 2, spring 76 is coiled about shaft 77 on which the lever 73—74 is mounted. Shaft 77 is riveted or otherwise fixedly mounted on supporting plate 13. One end 78 of spring 76 bears against supporting plate 13 and the other end 79 bears against lever 73—74 so as to bias this lever for rotation in counterclockwise direction, as seen in Fig. 1. Also pivotally mounted on shaft 77 is a gear shift mechanism, generally indicated at 80. Gear shift mechanism 80 has a tubular portion 81 mounted for rotation on shaft 77. A spring 82 bears at one end 83 on lever 73—74 and at its opposite end 84 on an arm 85 which has at its opposite or lower end roughened or serrated faces 86 and 87. Face 86 is adapted for movement into and out of engagement with the roughened or serrated circumference of disc 53 and roughened or serrated face 87 is adapted for movement into and out of engagement with the roughened or serrated circumference of disc 39.

Arm 85 is normally biased for counterclockwise rotation by spring 76 which is stronger than and therefore overcomes spring 82 so that face 87 is normally in engagement with the rim of disc 39. Spring 82 biases arm 85 clockwise, as seen in Fig. 4, so that pin 75 engages the left edge of arm 85. Spring 82 thus provides a yielding connection between link 71 and arm 85 so that, when the arm 85 is moved from one position to the other, the discs 39 and 53 are not struck a hard blow.

Modification of Fig. 5

This modification provides means for actuating gear shift mechanism 80 by hand directly instead of through a circuit-maker-and-breaker, an electric circuit, and a solenoid, as in Fig. 1. Fig. 5 shows the parts constituting the mechanical operating means in the inner or left position of their path of travel as in Fig. 5 which is the position opposite to that in which the equivalent parts are shown in Fig. 1.

These mechanical operating means comprise a handle 711 attached to one end of a sliding link 710 whose opposite end is secured to pin 72.

Handle 711 may be pushed in or pulled out to actuate the gear shift mechanism in the same manner as it is operated by solenoid 67. The distance between the inner or left end of handle 711, as seen in Fig. 5, and the side of the casing indicates which gear train is in mesh. If desired, a separate scale cooperating with handle 711 may be provided. A projection 712 pressed by and forming part of a spring 713 cooperates with a depression 714 in handle 711 to hold handle 711 in the inner or left end of its travel against the bias of spring 76. If it is desired to return the gear shift mechanism and its associated parts to the outer or right position, as seen in Fig. 5, the handle 711 is pulled to the right.

Operation

Figs. 3 and 4 show that motor 11, by means of gear 140, drives gears 15, 17, 19, 20, 21, 23, 24, 26, 27, 29, 31, 32, 33, 330, 43, 42 and 44. Gear 44 is fastened to shaft 35 by pin 45 so that shaft 35 and its end portion 64 are rotated. Fig. 3 shows that this rotation of portion 64 rotates a gear 65, chart drive roller 66, and chart 68.

The foregoing is the normal operation of the gear trains because arm 85 is biased by spring 76 so that face 87 engages the rim of disc 39 and holds pin 40 stationary so that gear 330 drives gears 43 and 42.

If it is desired to shift the speed at which motor 11 drives the chart 68, the switch (not shown) which controls the supply of electricity to solenoid 67 is closed so that solenoid 67 is energized. This causes coil 68 to attract armature 69 and move link 71 to the left. This causes lever 73 to move clockwise (as seen in Fig. 1) which likewise moves arm 85 clockwise and causes face 87 to disengage the edge of disc 39. Substantially simultaneously face 86 engages the edge of disc 53. Disc 39 is therefore free for rotation while disc 53 is held against rotation. When disc 39 is held against rotation, shaft 40 is held stationary so that gear 330 drives gears 43, 42, 44, shaft 35, and portion 64 from whence motion is transmitted to chart 68.

Referring to the extreme right of Fig. 4, gear 23 drives gears 61 and 60. Gear 60 drives gears 57 and 56 so that gear 56 drives gear 58 and shaft 49 fastened thereto by pin 59. Gear 62 is also fastened to shaft 49 by pin 63 and meshes with gear 47 fastened to shaft 35 by pin 46 so that shaft 35 and its end portion 64 are rotated. Fig. 3 shows that this rotation of portion 64 rotates a gear 65, chart drive roller 66, and chart 68.

The foregoing is not the normal operation of the gear train because arm 85 is biased by spring 76 so that face 87 engages the rim of disc 39. Normally pin 54 is not held stationary so that gear 60 drives planet gears 57 and 56 around gear 58 as a sun without causing any rotation of shaft 49 because disc 53 is not held stationary. During the operation described above, face 86 is out of engagement with disc 53. Therefore, gear 330 drives gears 43 and 42 as a plane about gears 330 and 44 as a sun without rotating shaft 35.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Means for driving a chart at a selected one of a plurality of speeds, said means including, a chart-driving motor, a first gear train connected to and driven by said motor, an output shaft connected to and driven by the output end of said gear train, said first gear train including a sun gear, a plurality of planet gears, one of which meshes with and is driven by said sun gear, a shaft on which said planet gears are mounted for rotation, and a disc on which said shaft and said planet gears are mounted for translation, a second gear train meshing with the output gear of the first gear train and including a sun gear, a pair of planet gears, one of said planet gears meshing with said sun gear, a shaft on which said planet gears are mounted for rotation, a disc on which said shaft is mounted for translation, and an arm selectively movable out of engagement with one of said discs so as to free said disc and the planet gears carried thereby for translation and into engagement with the other of said discs so as to hold said disc and the planet gears carried thereby against translation so that said planet gears rotate and transmit movement from sun gear to said output shaft.

2. Means for driving the recording chart of an instrument at a selected one of a plurality of speeds, including, a chart drive motor having an output gear, a first gear train having one ratio of input speed to output speed, a second gear train having a different ratio of input speed to output speed, said gear trains constantly meshing with the output gear of said motor so as to be continuously driven thereby, means for driving the chart from the output of either of said gear trains, means manually operable for selectively connecting the output of one or other of said gear trains to said means for driving said chart, and means for latching said manually operable means in one of its operative positions.

3. A multi-speed driving mechanism for moving the recording chart of an indicating and/or recording instrument at one of said multispeeds, a plurality of pairs of sun-and-planet gears meshing with said driving mechanism, a plurality of discs each carrying one of said planet gears, an arm mounted for substantially simultaneous disengagement from one of said discs and engagement with the other of said discs to free one of said planet gears for rotation about its sun and to hold the other of said planet gears for driving engagement with its sun, manually operable means for moving said arm from one of its positions to another, and spring means interposed between the manually operable means and said arm for cushioning the engagement of said arm with the engaged one of said discs.

4. A combination according to claim 3 in which said spring means includes a spring biasing said arm toward engagement with one of said discs.

5. A combination according to claim 3 in which said spring means includes a spring biasing said arm toward engagement with one of said discs, and a second spring providing a yielding connection between said manually operable means and said arm.

6. A combination according to claim 1 in which there are provided manually operable means for selectively moving said arm.

7. A combination according to claim 1 including a solenoid to selectively move said arm.

8. A combination according to claim 6 including a solenoid for selectively moving said arm.

9. A combination according to claim 1 including spring means connected to said arm so as to bias said arm into engagement with one of the said discs.

10. A combination according to claim 1 including spring means yielding on the engagement of said arm with either of said discs to cushion said disc and said arm against the shock of engagement.

References Cited in the file of this patent

UNITED STATES PATENTS

| | | |
|---|---|---|
| 983,452 | Kirk | Feb. 7, 1911 |
| 1,038,380 | Johanson | Sept. 10, 1912 |
| 2,115,849 | Gustavson | May 3, 1938 |
| 2,203,057 | Moore | June 4, 1940 |
| 2,248,942 | Black | July 15, 1941 |
| 2,331,761 | Black | Oct. 12, 1943 |
| 2,521,771 | Bechle | Sept. 12, 1950 |
| 2,524,564 | Gorham | Oct. 3, 1950 |